(12) United States Patent
Amano et al.

(10) Patent No.: US 10,704,591 B2
(45) Date of Patent: *Jul. 7, 2020

(54) HALF BEARING AND SLIDING BEARING

(71) Applicant: DAIDO METAL COMPANY LTD., Nagoya (JP)

(72) Inventors: Seiji Amano, Inuyama (JP); Toru Watanabe, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/416,611

(22) Filed: May 20, 2019

(65) Prior Publication Data

US 2019/0360520 A1 Nov. 28, 2019

(30) Foreign Application Priority Data

May 23, 2018 (JP) .................................. 2018-099148

(51) Int. Cl.
*F16C 9/02* (2006.01)
*F16C 33/10* (2006.01)
(Continued)

(52) U.S. Cl.
CPC .................. *F16C 9/02* (2013.01); *F16C 9/04* (2013.01); *F16C 17/022* (2013.01); *F16C 33/1065* (2013.01); *F16C 2360/22* (2013.01)

(58) Field of Classification Search
CPC .......... F16C 9/02; F16C 17/022; F16C 17/04; F16C 17/045; F16C 17/102; F16C 33/046;
(Continued)

(56) References Cited

U.S. PATENT DOCUMENTS 3,133,769 A * 5/1964 Drake ..................... F16C 33/22
384/145
5,192,136 A * 3/1993 Thompson ................ F16C 9/02
384/123
(Continued)

FOREIGN PATENT DOCUMENTS

GB 1509482 A * 5/1978 ............ F16C 17/045
JP 58-149622 U 10/1983
(Continued)

*Primary Examiner* — Marcus Charles
(74) *Attorney, Agent, or Firm* — Snyder, Clark, Lesch & Chung, LLP

(57) ABSTRACT

Provided is a semi-cylindrical shaped half bearing. The half bearing has an inner surface forming a sliding surface. The sliding surface includes a plurality of recesses. Each recess has a smooth recess surface recessed from the sliding surface toward an outer diameter side of the half bearing. The recess surface forms a convex curve toward the outer diameter side of the half bearing in a cross-sectional view in any direction perpendicular to the sliding surface. The recess surface includes a plurality of circumferential grooves. The circumferential grooves are recessed from the recess surface toward the outer diameter side of the half bearing. The circumferential grooves extend along a circumferential direction of the half bearing so that smooth surfaces and the circumferential grooves are alternately arranged on the recess surface.

11 Claims, 6 Drawing Sheets

(51) Int. Cl.
*F16C 33/04* (2006.01)
*F16C 17/02* (2006.01)
*F16C 9/04* (2006.01)

(58) Field of Classification Search
CPC   F16C 33/103; F16C 33/1065; F16C 33/1075; F16C 33/107; F16C 2360/22; F16C 2240/42; F02F 7/0053
USPC ........ 384/107, 112, 121, 275, 293–294, 305, 384/368, 420, 429, 116, 283–284
See application file for complete search history.

(56) References Cited

U.S. PATENT DOCUMENTS

| | | | | |
|---|---|---|---|---|
| 5,520,466 | A * | 5/1996 | Everitt | F16C 17/10 384/124 |
| 6,095,690 | A * | 8/2000 | Niegel | F16C 17/10 384/288 |
| 6,149,310 | A * | 11/2000 | Ono | F02F 7/0053 384/294 |
| 6,511,226 | B2 * | 1/2003 | Thompson | F16C 9/02 384/294 |
| 6,736,729 | B2 * | 5/2004 | Wang | F16D 3/223 29/898.1 |
| 7,354,199 | B2 * | 4/2008 | Welch | F16C 9/00 384/275 |
| 8,376,618 | B2 * | 2/2013 | Lehmann | F16C 9/02 384/275 |
| 8,393,792 | B2 * | 3/2013 | Muramoto | F16C 33/046 384/429 |
| 9,188,159 | B2 * | 11/2015 | Tanaka | F16C 33/046 |
| 9,664,229 | B2 * | 5/2017 | Murrish | F16C 7/023 |
| 9,797,435 | B2 * | 10/2017 | Tanaka | F16C 9/02 |

FOREIGN PATENT DOCUMENTS

| | | | |
|---|---|---|---|
| JP | 07305721 A | * | 11/1995 |
| JP | 08-277831 A | | 10/1996 |
| JP | 2000-504089 A | | 4/2000 |
| JP | 2008-95721 A | | 4/2008 |

* cited by examiner

HALF BEARING AND SLIDING BEARING

TECHNICAL FIELD

The present invention relates to a half bearing for constituting a sliding bearing for supporting a crankshaft of an internal combustion engine. The present invention also relates to a cylindrical sliding bearing including the half bearing, for supporting the crankshaft of the internal combustion engine.

BACKGROUND OF THE INVENTION

A crankshaft of an internal combustion engine is supported in its journal part by a lower portion of a cylinder block of the engine via a main bearing constituted by a pair of half bearings. In the main bearing, lubrication oil is discharged by an oil pump and fed from an oil gallery in a cylinder block wall, via a through hole in a wall of the main bearing, into a lubrication oil groove formed along an inner surface of the main bearing. Furthermore, the journal part has a first lubrication oil passage passing through the journal part in a diameter direction of the journal part, and openings at both ends of the first lubrication oil passage communicate with the lubrication oil groove of the main bearing. A second lubrication oil passage passing through a crank arm part branches off from the first lubrication oil passage of the journal part, and communicates with a third lubrication oil passage passing through a crankpin in a diameter direction of the crankpin. Thus, the lubrication oil fed from the oil gallery in the cylinder block wall via the through hole into the lubrication oil groove on the inner surface of the main bearing passes through the first lubrication oil passage, the second lubrication oil passage, and the third lubrication oil passage. The lubrication oil is then supplied from a discharge port that opens at an end of the third lubrication oil passage to a gap between the crankpin and a sliding surface of a connecting rod bearing constituted by a pair of half bearings (see JP 08-277831A, for example). The oil is supplied to a gap between a surface of the crankshaft and a sliding surface of the main bearing and the connecting rod bearing.

In order to reduce friction loss during sliding between a crankshaft and a half bearing in such a sliding bearing, it has been proposed to form a plurality of minute recesses on a sliding surface of the half bearing (see JP 58-149622U, JP 2008-95721A, and JP 2000-504089A, for example).

SUMMARY OF THE INVENTION

As described above, JP 58-149622U, JP 2008-95721A, and JP 2000-504089A disclose a conventional half bearing having a sliding surface including a plurality of minute recesses. When a surface of a crankshaft moves closer to the sliding surface of the half bearing during operation of an internal combustion engine, turbulence occurs in an oil flow near the recess. The turbulence causes friction loss, and greatly reduces pressure of the oil between the sliding surface adjacent to the recess and the surface of the shaft. This causes the oil to unable to bear a load of the shaft so that the surface of the shaft comes into contact with the sliding surface, thereby increasing the friction loss.

An object of the present invention is to provide a half bearing for constituting a sliding bearing of a crankshaft of an internal combustion engine and reducing friction loss caused by occurrence of turbulence during operation of the internal combustion engine. Another object of the present invention is to provide the sliding bearing.

In an aspect of the present invention, a half bearing is provided for constituting a sliding bearing for supporting a crankshaft of an internal combustion engine. The half bearing has a semi-cylindrical shape, and has an inner surface forming a sliding surface. The sliding surface of the half bearing includes a plurality of recesses. Each recess has a smooth recess surface recessed from the sliding surface toward an outer diameter side of the half bearing. The recess surface forms a convex curve toward the outer diameter side of the half bearing in a cross-sectional view in any direction perpendicular to the sliding surface of the half bearing. The recess surface includes a plurality of circumferential grooves. The circumferential grooves are recessed from the recess surface toward the outer diameter side of the half bearing. The circumferential grooves extend along a circumferential direction of the half bearing so that smooth surfaces and the circumferential grooves are alternately arranged on the recess surface.

According to an embodiment of the present invention, the recesses preferably have a depth D1 of 2 to 50 μm. The depth D1 of the recess is defined as a length from the sliding surface to a deepest part of the recess surface.

According to an embodiment of the present invention, the circumferential grooves preferably have a depth of 0.2 to 3 μm. Furthermore, the circumferential grooves preferably have a width of 5 to 50 μm. Furthermore, the circumferential grooves are preferably arranged with a pitch of 5 to 100 μm.

According to an embodiment of the present invention, the recesses preferably have an opening of a circular shape, an elliptical shape, or a quadrilateral shape.

Furthermore, the opening preferably has an elliptical shape with a major axis of the elliptical shape extending along the circumferential direction of the half bearing.

According to an embodiment of the present invention, the recesses are preferably uniformly located throughout the sliding surface of the half bearing.

According to an embodiment of the present invention, as the recess is located closer to a circumferential center of the half bearing, a depth D1 of the recess (i.e., a length from the sliding surface to a deepest part of the recess surface) is preferably increased. In other words, as the recess is located closer to a circumferential end of the half bearing, the depth D1 of the recess is preferably decreased.

According to an embodiment of the present invention, as the recess is located closer to a circumferential center of the half bearing, an area of an opening of the recess is preferably increased.

In another aspect, provided is a cylindrical sliding bearing for supporting a crankshaft of an internal combustion engine, which includes the above half bearing. The sliding bearing is preferably constituted by combining a pair of the above half bearings.

DETAILED DESCRIPTION OF THE INVENTION

Embodiments of the present invention will be described below with reference to the drawings.

Figure 1:
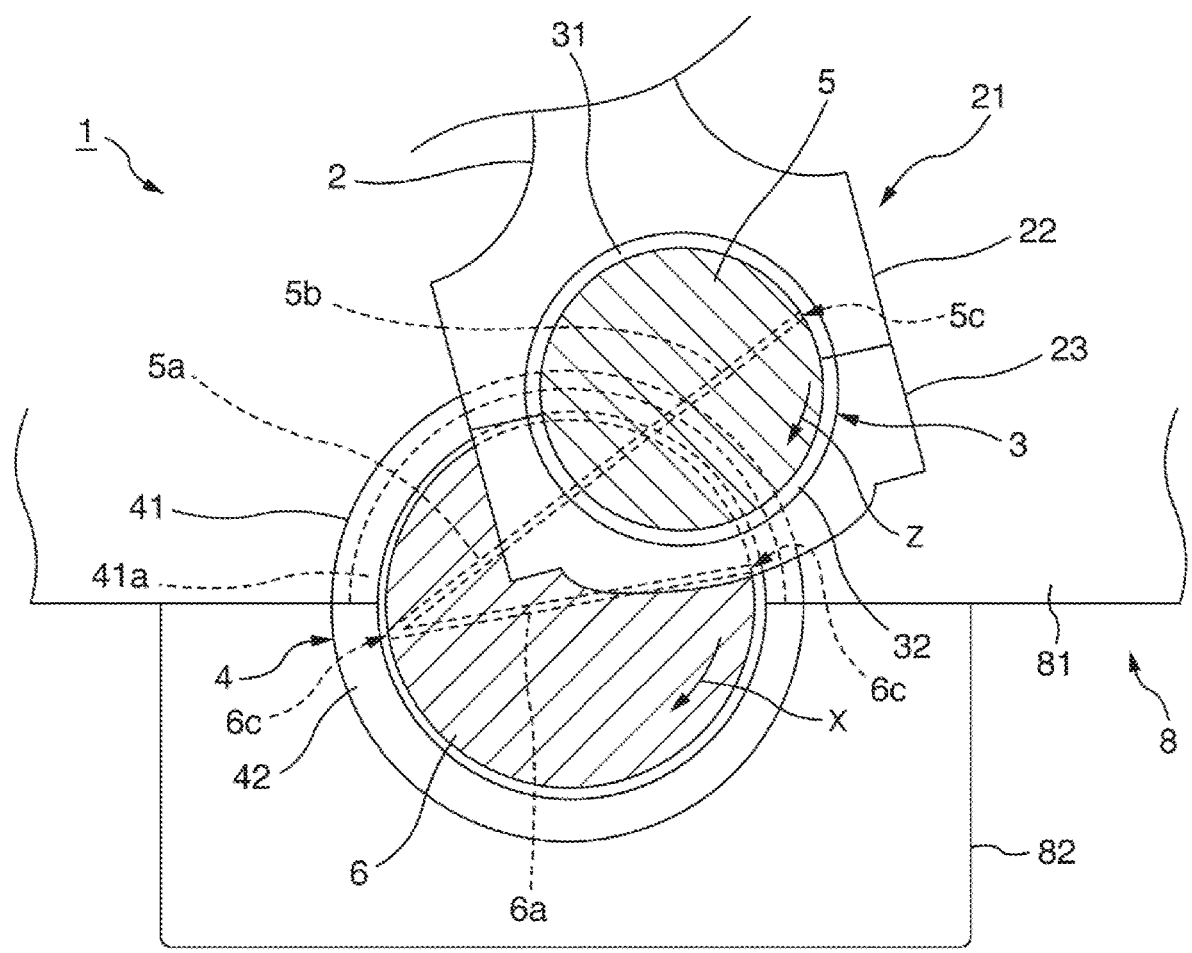
FIG. 1 is a schematic diagram showing a bearing device of a crankshaft.

FIG. 1 schematically shows a bearing device 1 of an internal combustion engine. The bearing device 1 includes a journal part 6, a crankpin 5, and a connecting rod 2. The journal part 6 is supported by a lower portion of a cylinder block 8. The crankpin 5 is integrally formed with the journal part 6 and rotates about the journal part 6. The connecting rod 2 transmits reciprocating motion from the internal combustion engine to the crankpin 5. The bearing device 1 further includes sliding bearings for supporting a crankshaft, one of which is a main bearing 4 rotatably supporting the journal part 6 and another of which is a connecting rod bearing 3 rotatably supporting the crankpin 5.

The following will describe a single journal part 6 and a single crankpin 5 in the drawings for convenience of description, while the crankshaft includes a plurality of journal parts 6 and a plurality of crankpins 5. With regard to a positional relationship between the journal part 6 and the crankpin 5 in a vertical direction of a page in FIG. 1, the journal part 6 is located behind the crankpin 5 in FIG. 1.

The journal part 6 is pivotally supported by a cylinder block lower portion 81 of the internal combustion engine via the main bearing 4 constituted by a pair of half bearings 41 and 42. The half bearing 41 on an upper side in FIG. 1 has an oil groove 41a that extends along an entire length of an inner surface of the half bearing 41. The journal part 6 has a lubrication oil passage 6a that passes through the journal part 6 in a diameter direction of the journal part 6. When the journal part 6 rotates in a direction of an arrow X, entrance openings 6c at both ends of the lubrication oil passage 6a alternately communicate with the oil groove 41a of the main bearing 4.

The crankpin 5 is pivotally supported by a large end housing 21 (a rod-side large end housing 22 and a cap-side large end housing 23) of the connecting rod 2 via the connecting rod bearing 3 constituted by a pair of half bearings 31 and 32.

In the main bearing 4, lubrication oil is discharged by an oil pump and fed from an oil gallery in a cylinder block wall, via a through hole in a wall of the main bearing 4, into the oil groove 41a formed along an inner surface of the main bearing 4, as described above.

Furthermore, the first lubrication oil passage 6a passes through the journal part 6 in the diameter direction of the journal part 6, and the entrance openings 6c of the first lubrication oil passage 6a communicate with the lubrication oil groove 41a. A second lubrication oil passage 5a passing through a crank arm part (not shown) branches off from the first lubrication oil passage 6a of the journal part 6, and communicates with a third lubrication oil passage 5b passing through the crankpin 5 in a diameter direction of the crankpin 5.

Thus, the lubrication oil passes through the first lubrication oil passage 6a, the second lubrication oil passage 5a, and the third lubrication oil passage 5b, and is then supplied from a discharge port 5c at an end of the third lubrication oil passage 5b to a gap formed between the crankpin 5 and the connecting rod bearing 3.

In general, the main bearing 4 and the connecting rod bearing 3 bear a dynamic load from the crankshaft by pressure generated in oil between a sliding surface of the main bearing 4 and the connecting rod bearing 3 and a surface of the shaft. Throughout operation of the internal combustion engine, a load is applied to the sliding surface of the main bearing 4 and the connecting rod bearing 3, and the load and its direction constantly change. Central axes of the journal part 6 and the crankpin 5 move eccentrically with respect to a bearing central axis of, respectively, the main bearing 4 and the connecting rod bearing 3 so that oil film pressure is generated proportionally to the load. Accordingly, a bearing gap of the main bearing 4 and the connecting rod bearing 3 (a gap between the surface of the shaft and the sliding surface) constantly changes at any position on the sliding surface. For example, in the case of a four-stroke internal combustion engine, a maximum load is applied to a connecting rod bearing and a main bearing in a combustion stroke. In this case, for example for the connecting rod bearing, the crankpin 5 moves in a direction (indicated by "arrow Q") (see FIG. 8) toward a portion of a sliding surface 7 near a circumferential center of the half bearing 31 on the upper side in FIG. 1. Then, the portion of the sliding surface near the circumferential center of the half bearing comes closest to a surface of the crankpin, and a load is applied in a direction toward the portion of the sliding surface near the circumferential center of the half bearing.

For the main bearing, a load is applied in a direction toward a portion of the sliding surface near a circumferential center of the half bearing provided on a bearing cap 82 side on a lower side in FIG. 1, and the portion of the sliding surface near the circumferential center of the half bearing on the lower side comes closest to a surface of the journal part 6.

Figure 10:
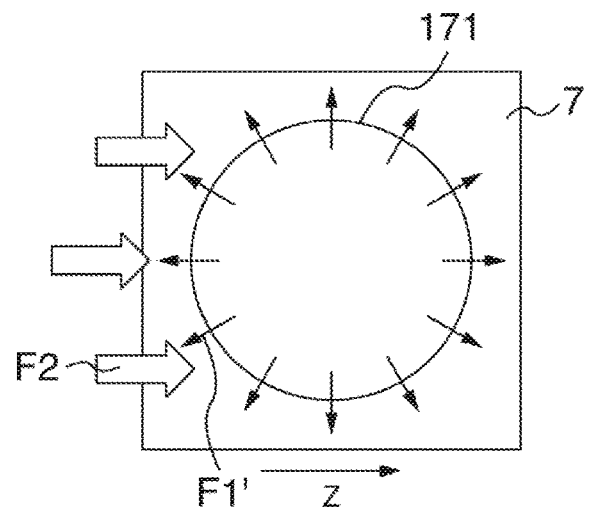
FIG. 10 shows a recess of Comparative Example, viewed from the sliding surface side.

A conventional half bearing having a sliding surface including a plurality of minute recesses has the following problems. When a surface of a shaft separated from the sliding surface of the half bearing having the minute recesses moves relatively closer to the sliding surface and the surface of the shaft comes closest to the sliding surface, oil in the recess is compressed to have high pressure, and flows out from the recess to a gap between the sliding surface and the surface of the shaft. As shown in FIG. 10

(Comparative Example), in a case where a minute recess 171 has a smooth surface, among oil flows compressed to have high pressure in the recess and overflowing from the recess into a gap between a sliding surface and a surface of a shaft, only some of the oil flows flow toward the same direction as a rotation direction Z of the shaft, and most of the oil flows form oil flows F1' flowing toward directions different from the rotation direction Z of the shaft. In the gap between the sliding surface and the surface of the shaft, oil flows F2 following the surface of the rotating shaft have been formed. Thus, when the oil flows F1' toward the directions different from the rotation direction Z of the shaft flow out from the recess, the oil flows flowing in different directions collide with each other between the sliding surface adjacent to an opening of the recess and the surface of the shaft, thereby causing turbulence. The turbulence causes friction loss. When the turbulence greatly reduces pressure of the oil between the sliding surface adjacent to the opening of the recess and the surface of the shaft, a load of the shaft becomes unbearable so that the surface of the shaft comes into contact with the sliding surface, thereby increasing the friction loss.

The present invention addresses such problems of the conventional techniques. In the following, an exemplary half bearing of the present invention applied to the connecting rod bearing 3 will be described. However, the present invention is not limited to the connecting rod bearing 3, and may be configured as a half bearing for constituting the main bearing 4.

Both of the pair of half bearings constituting the connecting rod bearing 3 or the main bearing 4 may be the half bearing of the present invention. Alternatively, only one of the pair of half bearings constituting the connecting rod bearing 3 or the main bearing 4 may be the half bearing of the present invention, and the other half bearing may be a conventional half bearing having no recesses on a sliding surface.

Figure 2:
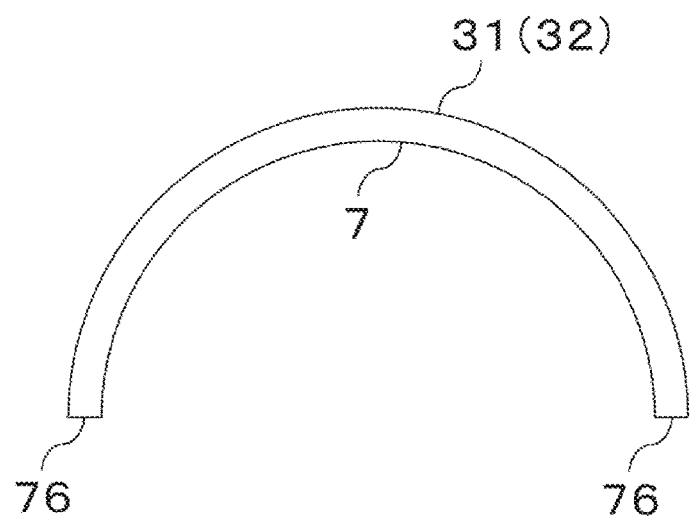
FIG. 2 shows a half bearing according to a first embodiment of the present invention, viewed from an axial direction of the half bearing.

FIG. 2 shows a first embodiment of the half bearing (for the connecting rod bearing 3) according to the present invention (viewed from an axial direction of the half bearing). The connecting rod bearing 3 is formed by combining the pair of half bearings 31, 32 into a cylindrical shape as a whole so that circumferential end faces 76 of the half bearing 31 are butted against circumferential end faces 76 of the half bearing 32. An inner surface of the cylindrical shape forms the sliding surface 7.

Preferably, the half bearing 31, 32 has a constant thickness in a circumferential direction. However, the half bearing 31, 32 may have a changing thickness so that the thickness is maximum at the circumferential center and is continuously decreased toward the circumferential end faces 76.

Figure 3:
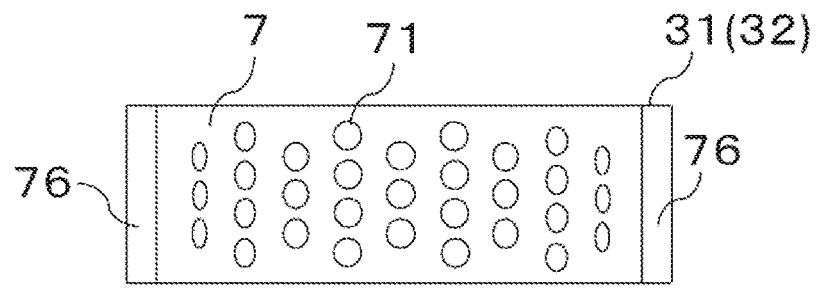
FIG. 3 is a plan view of the half bearing in FIG. 2, viewed from a sliding surface side.
Figure 4:
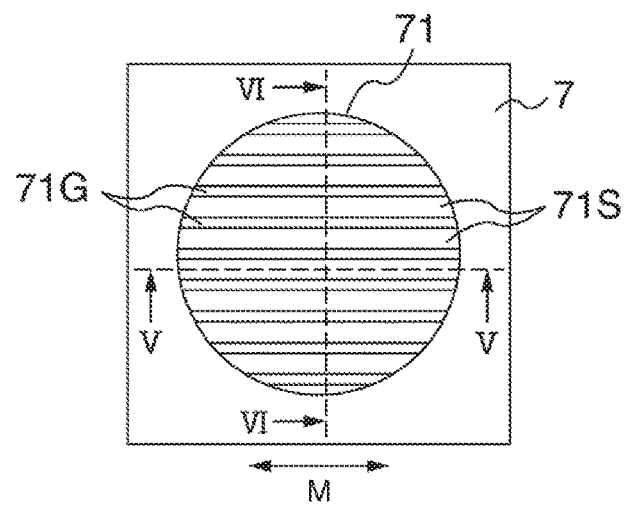
FIG. 4 shows a recess in FIG. 3, viewed from a sliding surface side.

FIG. 3 shows an example of recesses on the sliding surface of the half bearing. FIG. 4 shows an example of a recess viewed from a sliding surface side. The present invention is not limited to the embodiment. For facilitating understanding, recesses 71 are exaggerated in the drawings.

The recesses 71 are located on the sliding surface 7 of the half bearing 31, 32. In this embodiment, the recesses 71 have openings having the same shape and size, such as a depth, and are uniformly arranged substantially throughout the sliding surface. The "uniform arrangement" of the recesses 71 on the sliding surface 7 does not indicate strictly geometrically uniform arrangement, and may be approximately or substantially uniform arrangement. FIG. 3 is a plan view of the half bearing 31, 32 having a semi-cylindrical shape, viewed from above the sliding surface side, and thus recesses near the circumferential ends 76 appear distorted in FIG. 3.

FIG. 4 shows the recess 71 having a circular opening on the sliding surface 7. The "circular" opening does not indicate a geometrically precise circular shape, and may be substantially circular. The recess 71 has a smooth surface 71S and a plurality of circumferential grooves 71G. The circumferential grooves 71G extend parallel to a circumferential direction M of the half bearing 31, 32. The circumferential groove 71G preferably extends from a peripheral edge to an opposite peripheral edge of the recess 71. The smooth surfaces 71S and the circumferential grooves 71G are alternately arranged in an axial direction of the half bearing 31, 32 in the recess 71. The term "smooth surface 71S" indicates a smooth surface having no grooves, protrusions, or the like, but may have minute (sufficiently small as compared with the circumferential grooves) asperities.

Figure 5:
FIG. 5 is a cross-sectional view of a V-V cross section (along a circumferential direction) in FIG. 4.

In FIG. 5, the recess surface (the surface 71S of the recess excluding the circumferential grooves) is recessed toward an outer diameter side of the half bearing 31, 32 in a cross-sectional view (a V-V cross section in FIG. 4) in a direction parallel to the circumferential direction of the half bearing 31, 32. That is, the recess surface forms a convex curve toward the outer diameter side. The circumferential groove 71G in a cross-sectional view in the circumferential direction of the half bearing 31, 32 is also recessed from the recess surface toward the outer diameter side of the half bearing 31, 32.

Figure 6:
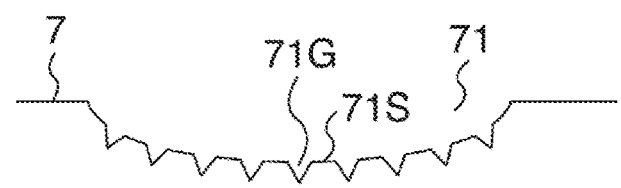
FIG. 6 is a cross-sectional view of a VI-VI cross section (along an axial direction) in FIG. 4.

Furthermore, the recess 71 forms a curve recessed toward the outer diameter side of the half bearing 31, 32 also in a cross-sectional view in any direction other than the circumferential direction of the half bearing 31, 32. In this context, the "cross section" indicates a cross section perpendicular to the sliding surface 7. FIG. 6 shows, as an example, a surface of the recess 71 in a cross-sectional view (a VI-VI cross section in FIG. 4) in the axial direction of the half bearing.

The recess 71 has a depth D1 from the sliding surface 7 (i.e., a depth at a deepest part of the recess from the sliding surface adjacent to the recess) preferably of 2 to 50 μm, and more preferably of 2 to 25 μm. In a case where the opening of the recess 71 has a circular shape, the opening may have a diameter of 0.05 to 5 mm. In a case where the opening of the recess has an elliptical shape or any other shape other than the circular shape, the opening preferably has a diameter of a circle having an area equal to that of the opening (equivalent circle diameter).

The circumferential grooves 71G extend from the peripheral edge of the recess 71 along a direction parallel to the circumferential direction of the half bearing 31, 32. The circumferential grooves 71G are allowed to be slightly tilted (up to 1°) with respect to the circumferential direction of the half bearing 31, 32.

The circumferential grooves 71G preferably have a depth D2 (see FIG. 7) of 0.2 to 3 μm. The depth D2 of the circumferential grooves 71G is smaller than the depth D1 of the recess 71. The "depth of the circumferential groove" indicates a depth at a deepest part of the circumferential groove from the smooth surface adjacent to the circumferential groove, viewed in a cross-sectional view along a width direction of the circumferential groove.

Figure 7:
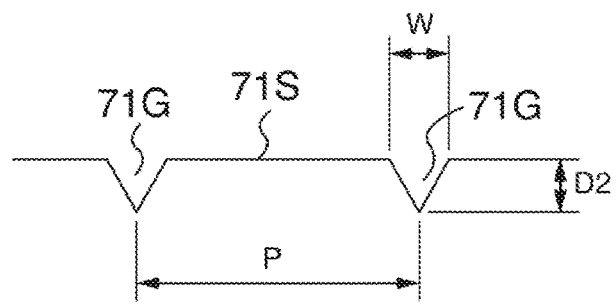
FIG. 7 is a cross-sectional view of a circumferential groove.

A width W of the circumferential groove 71G (i.e., a length of the circumferential groove 71G on the surface 71S of the recess 71 in the axial direction of the half bearing, see FIG. 7) is preferably 5 to 50 μm. The width W is preferably determined such that at least five circumferential grooves 71G can be formed in a single recess 71. In the recess 71, the circumferential grooves 71G are arranged with a pitch P (i.e., a length between the deepest parts of the adjacent circumferential grooves 71G in the axial direction of the half bearing 31, 32, see FIG. 7) in the axial direction of the half bearing 31, 32. The pitch is preferably 5 to 100 μm.

In an embodiment, the depth D2 of the circumferential groove 71G, which is a depth from the surface 71S of the recess 71, is made constant over its length or along a direction in which the circumferential groove 71G extends, except in circumferential end regions of the recess. Furthermore, the width W of the circumferential groove 71G is also made constant over the length (see FIG. 6). A cross section of the circumferential groove 71G is preferably V-shaped. However, the shape of the cross section of the circumferential groove 71G is not limited to the V-shape, and may be another shape.

However, the depth D2 and the width W of the circumferential groove 71G may be changed along the length of the circumferential groove 71G In such a case, the "depth of the circumferential groove" and the "width of the circumferential groove" respectively indicate the maximum depth and the maximum width of the circumferential groove 71G, and the maximum values are preferably sized to meet the above described depth and width.

The connecting rod bearing 3 of the embodiment is formed by combining a pair of half bearings into a cylindrical shape as a whole so that the circumferential end faces 76 of one of the half bearings are butted against the circumferential end faces 76 of the other half bearing. Both of the pair of half bearings are preferably the half bearing 31, 32 of the present invention. Alternatively, only one of the pair of half bearings may be the half bearing 31, 32 of the present invention. The half bearing 31, 32 may have a sliding layer made of a Cu bearing alloy or an Al bearing alloy. Alternatively, the half bearing 31, 32 may have a sliding layer made of a Cu bearing alloy or an Al bearing alloy on a back-metal layer made of an Fe alloy. The sliding surface 7 which is the inner surface of the cylindrical shape and includes an inner surface of the recess 71 may have a surface coating or overlay made of one of Bi, Sn, and Pb or an alloy thereof, which are softer than the bearing alloy. Alternatively, the surface coating may be made of a resin composition including synthetic resin as a main component. (Even in the case, the surface of the sliding layer is referred to as a "sliding surface" in this context). However, the surface of the recess 71 preferably does not have such a surface coating. If the surface of the recess 71 or a surface of the circumferential groove 71G has such a soft surface coating, when oil contains many foreign substances, the foreign substances are more likely to be embedded and accumulated. If the foreign substances are embedded and accumulated on the surface of the recess 71 or the surface of the circumferential grooves 71G, turbulence is more likely to occur in the oil flowing in the recess.

As described above, the half bearing of the present invention has the recesses 71 on the sliding surface, and each recess 71 has the smooth surface 71S and the plurality of circumferential grooves 71G Thus, the half bearing can reduce friction loss. A reason thereof will be described below.

Figure 8:
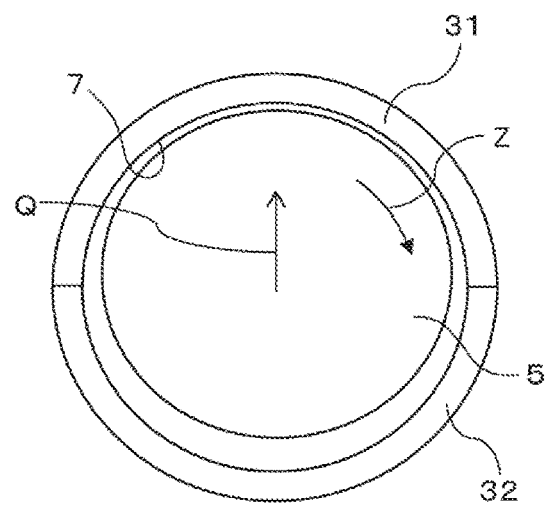
FIG. 8 shows relative movement of a shaft to half bearings.
Figure 9:
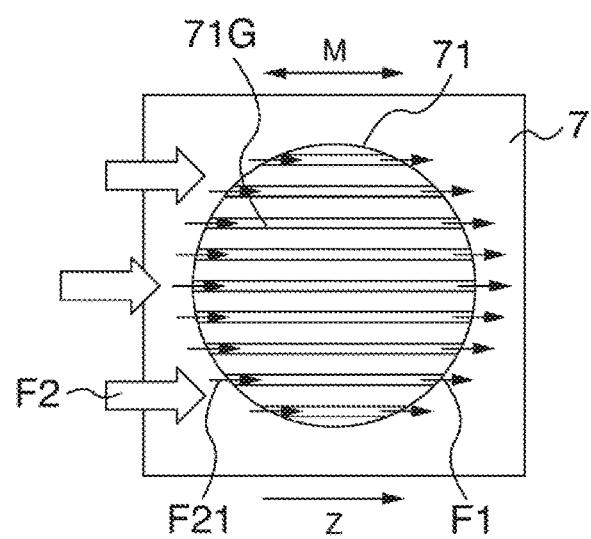
FIG. 9 shows oil flows in the recess in FIG. 4.

FIG. 8 shows a state where the surface of the shaft 5 separated from the sliding surface 7 of the half bearing 31 having the plurality of recesses 71 has moved relatively closer to the sliding surface 7, and the surface of the shaft 5 has come closest to the sliding surface 7. In this state, the oil in the recess 71 is compressed to have high pressure and flows out from the recess 71 into the gap between the sliding surface 7 and the shaft 5. The surface of the recess 71 has the plurality of circumferential grooves 71G extending in a direction parallel to the circumferential direction M of the half bearing 31. Thus, some of the oil flows F2 following the surface of the shaft 5 and flowing in the rotation direction Z of the surface of the shaft 5 form oil flows F21 in the circumferential groove 71G of the recess 71. The oil flows F21 flow into the recess 71 from the gap between the sliding surface 7 and the shaft on a rear side in the rotation direction Z. Accordingly, the oil in the recess 71 is guided to the circumferential groove 71G to flow toward the same direction as the circumferential direction M of the half bearing 31 (the rotation direction Z of the shaft 5). The oil in the recess 71 then flows out (F1) along the circumferential direction M into the gap between the sliding surface 7 and the shaft 5 (FIG. 9).

On the other hand, in the gap between the sliding surface 7 and the surface of the shaft 5, the oil flows F2 following the surface of the rotating shaft have been formed. The oil flows F2 flow toward the same direction as the oil flows F1 flowing from the recess 71. Accordingly, turbulence is less likely to occur, and thus friction loss is less likely to occur.

FIG. 10 shows the recess 171 that differs from the recess of the present invention, viewed from the sliding surface side. The recess 171 has a circular opening on the sliding surface 7, and has a smooth surface. Other configurations are the same as those described above.

As shown in FIG. 10, in a case where the recess 171 has a smooth surface, oil compressed to have high pressure in the recess and overflowing from the recess into the sliding surface/shaft gap flows in all directions. Thus, only some of the oil flows flow toward the same direction as the rotation direction Z of the surface of the shaft 5, and most of the oil flows form the oil flows F1' flowing toward directions different from the rotation direction Z of the surface of the shaft 5. In the sliding surface/shaft gap, the oil flows F2 following the surface of the rotating shaft 5 have been formed. Thus, when the oil flows F1' toward the directions different from the rotation direction Z of the surface of the shaft 5 flow out from the recess, the oil flows flowing in different directions collide with each other between the sliding surface 7 adjacent to the opening of the recess 171 and the surface of the shaft 5, thereby causing turbulence. The turbulence causes friction loss, and greatly reduces pressure of the oil between the sliding surface adjacent to the opening of the recess and the surface of the shaft 5. Thus, a load of the surface of the shaft 5 becomes unbearable so that the surface of the shaft 5 comes into contact with the sliding surface 7, thereby increasing the friction loss.

Alternative non-limiting embodiments of the present invention will be described below.

Second Embodiment

Figure 11:
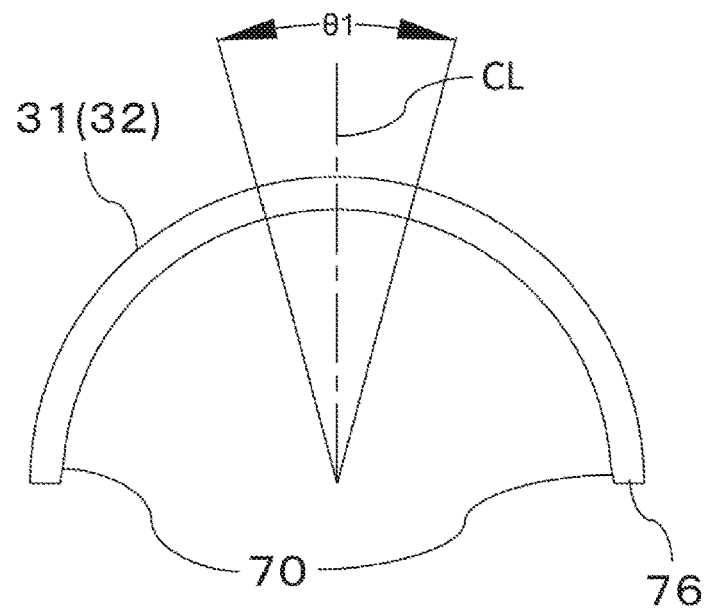
FIG. 11 shows the half bearing according to a second embodiment of the present invention, viewed from the axial direction of the half bearing.
Figure 12:
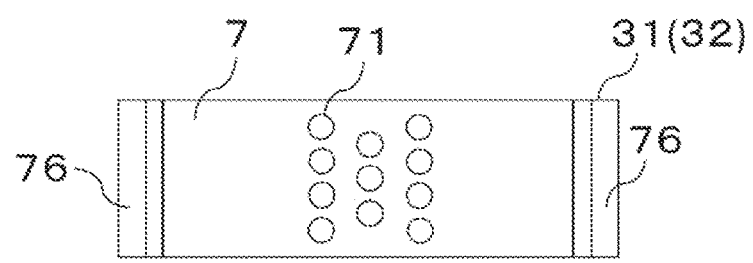
FIG. 12 is a plan view showing the half bearing in FIG. 11, viewed from the sliding surface side.

In FIGS. 11 and 12, a plurality of recesses 71 are uniformly located only in a range of predetermined circumferential angle θ1 (−15° to 15°), where the circumferential angle θ1 is taken with respect to a circumferential center CL of the half bearing 31, 32. The half bearing 31, 32 may have crush relieves 70 at the circumferential ends 76 of the sliding surface 7. Other configurations are the same as those of the half bearing 31, 32 described above. The circumferential angle is an angle around a center of an annular shape of the half bearing 31, 32. Herein, as mentioned above, the circumferential angle is taken with respect to the circumferential center CL (0°) of the half bearing (FIG. 11).

The crush relieves 70 are formed by reducing a thickness of a wall in a radial direction so that their surfaces are tapered from the original sliding surface 7 in circumferential end regions of the half bearing 31, 32. The crush relieves 70 are formed, for example, in order to absorb positional deviation or deformation of the circumferential end faces 76 when the pair of half bearings 31 and 32 are assembled in the connecting rod 2. Accordingly, a curvature center of a surface of the crush relief 70 differs from a curvature center of the sliding surface 7 in other regions (see SAE J506 (Items 3.26 and 6.4); DIN 1497, Section 3.2; and JIS D3102). For a bearing for a small internal combustion engine for a passenger vehicle, a depth of the crush relieves 70 at the circumferential ends of the half bearing (i.e., a distance from the original sliding surface to the crush relieves 70 at the circumferential ends 76) is generally approximately 0.01 to 0.05 mm.

A range where the recesses 71 are formed is not limited only to the portion of the sliding surface 7 near the circumferential center of the half bearing 31, 32, and the recesses 71 may be formed in any circumferential range on the sliding surface 7. The recess 71 may be formed in the crush relieves 70.

Third Embodiment

Figure 13:
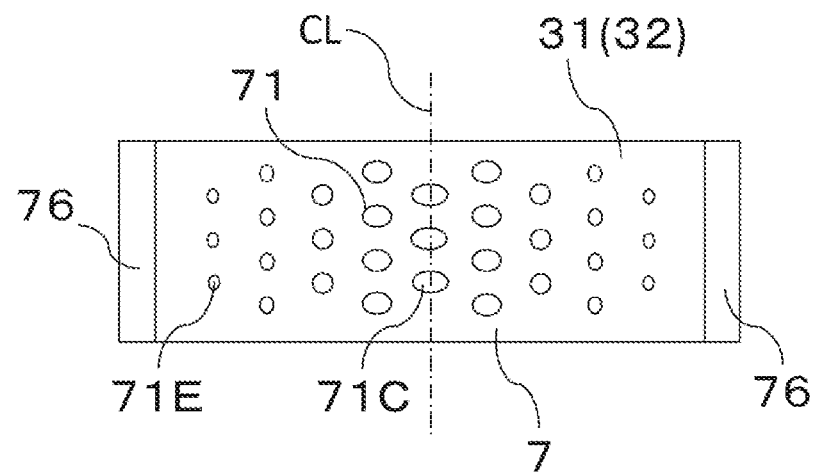
FIG. 13 shows the half bearing according to a third embodiment of the present invention, viewed from the sliding surface side.
Figure 14:
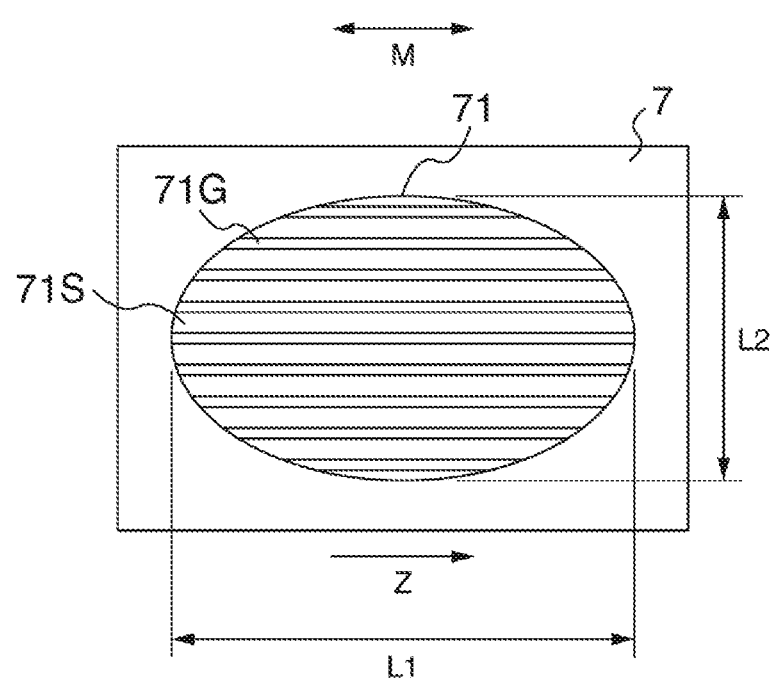
FIG. 14 shows a recess in FIG. 13, viewed from the sliding surface side.

In an embodiment shown in FIGS. 13 and 14, a plurality of recesses 71 are substantially uniformly located throughout the sliding surface 7, and each recess 71 has an elliptical opening with its major axis L1 extending parallel to the circumferential direction M of the half bearing 31, 32 and its minor axis L2 extending parallel to the axial direction of the half bearing 31, 32. The major axis L1 of the elliptical opening of the recess 71 may be slightly tilted (up to 3°) with respect to the circumferential direction of the half bearing 31, 32. (FIG. 13 is a plan view of the half bearing 31, 32 having a semi-cylindrical shape, viewed from the sliding surface side, and thus recesses 71E near the circumferential ends 76 appear distorted in FIG. 13.)

The recess 71 has a curved surface recessed toward the outer diameter side (convex toward the outer diameter side) of the half bearing 31, 32, not only in a cross-sectional view in a direction parallel to the circumferential direction of the half bearing 31, 32 and in a cross-sectional view in a direction parallel to the axial direction of the half bearing 31, 32 but also in a cross-sectional view in any direction other than the directions parallel to the circumferential direction and the axial direction of the half bearing 31, 32.

As the recess 71 is located closer to the circumferential center CL of the half bearing 31, 32, the depth D1 (maximum depth) of the recess 71 is increased. In other words, as the recess 71 is located closer to the circumferential end 76, the depth D1 is decreased. Furthermore, as the recess 71 is located closer to the circumferential center CL of the half bearing 31, 32, an area of the opening of the recess 71 is increased. In other words, as the recess 71 is located closer to the circumferential end 76, an area of the opening of the recess is decreased.

In the half bearing 31, 32 of the embodiment, each recess 71 has an elliptical opening with its major axis L1 extending parallel to the circumferential direction M of the half bearing 31, 32. Accordingly, when the surface of the shaft 5 comes closest to the sliding surface 7 of the half bearing 31, 32, oil in the recess 71 is guided to the circumferential groove 71G, and the oil is more likely to flow in the same direction as the circumferential direction M of the half bearing 31, 32 (rotation direction Z of the surface of the shaft 5). Thus, the oil is more likely to flow into the sliding surface/shaft gap of the half bearing 31, 32 in the same direction as the circumferential direction M of the half bearing 31, 32.

In a four-stroke internal combustion engine, as described above, the surface of the shaft 5 comes closest to the portion of the sliding surface 7 near the circumferential center of the half bearing 31, 32, and the surface of the shaft 5 is more likely to directly come into contact with the sliding surface 7.

As the recess 71 of the half bearing 31, 32 of the embodiment is located closer to the circumferential center CL of the half bearing 31, 32, the area of the opening of the recess 71 is increased. Accordingly, when the surface of the shaft 5 comes closer to the sliding surface, in the recess 71 located closer to the circumferential center CL of the sliding surface 7, pressure of a larger amount of oil is increased, and thus the surface of the shaft 5 is less likely to directly come into contact with the portion of the sliding surface 7 near the circumferential center of the half bearing 31, 32.

In a case where the internal combustion engine is configured such that during operation of the internal combustion engine, the surface of the shaft 5 is more likely to come into contact with a portion of the sliding surface 7 closer to a circumferential end of the half bearing 31, 32, unlike the embodiment, the recess 71 of the half bearing 31, 32 may be formed so that the recess 71 located closer to the circumferential end of the half bearing 31, 32 has an opening having a larger area on the sliding surface 7 and that the recess 71 located closer to the circumferential center CL has an opening having a smaller area.

Fourth Embodiment

Figure 15:
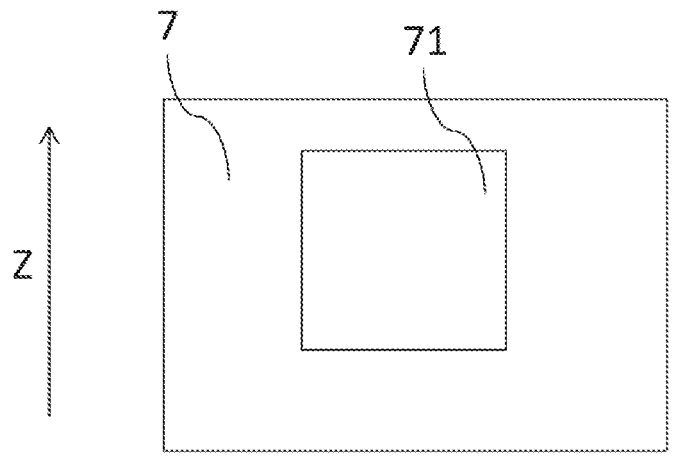
FIG. 15 shows a recess of the half bearing according to a fourth embodiment of the present invention, viewed from the sliding surface side.

FIG. 15 shows a recess 71 having a quadrilateral opening. An arrow Z indicates the rotation direction of the shaft. Two sides of the quadrilateral opening of the recess extend parallel to the rotation direction of the shaft. Circumferential grooves 71G are omitted in FIG. 15.

The recess 71 has a curved surface recessed toward the outer diameter side (convex toward the outer diameter side) of the half bearing 31, 32 not only in a cross-sectional view in a direction parallel to the circumferential direction of the half bearing 31, 32 and in a cross-sectional view in a direction parallel to the axial direction of the half bearing 31, 32 but also in a cross-sectional view in any direction other than the directions parallel to the circumferential direction and the axial direction of the half bearing 31, 32.

Fifth Embodiment

Figure 16:
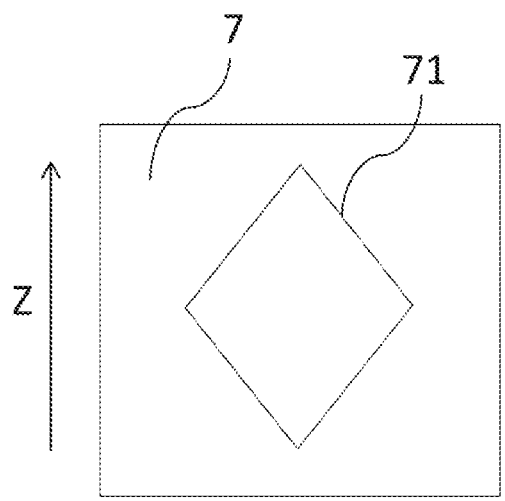
FIG. 16 shows a recess of the half bearing according to a fifth embodiment of the present invention, viewed from the sliding surface side.

FIG. 16 shows a recess 71 having a quadrilateral opening. Unlike in FIG. 15, a diagonal line of the quadrilateral opening of the recess is parallel to the rotation direction Z of the shaft. In FIG. 16, the recess 71 has a curved surface recessed toward the outer diameter side (convex toward the outer diameter side) of the half bearing 31, 32 not only in a cross-sectional view in a direction parallel to the circumferential direction of the half bearing 31, 32 and in a cross-sectional view in a direction parallel to the axial direction of the half bearing 31, 32 but also in a cross-sectional view in any direction other than the directions parallel to the circumferential direction and the axial direction of the half bearing 31, 32. Also in FIG. 16, circumferential grooves 71G are omitted.

As stated above, circular, elliptical, and quadrilateral shapes are explained as the shape of the opening of the recess 71. However, these shapes of the opening do not indicate geometrically precise circular, elliptical, and quadrilateral shapes, and they may be substantially circular, elliptical, and quadrilateral. Furthermore, the shape of the opening of the recess 71 is not limited to these shapes, and other shapes may be applied.

The above description discusses embodiments where the half bearing of the present invention is applied to a connecting rod bearing for supporting a crankpin of a crankshaft of an internal combustion engine. The half bearing of the present invention is also applicable to one or both of a pair of half bearings constituting a main bearing for supporting a journal part of the crankshaft. Furthermore, the half bearing may have an oil hole or an oil groove. The half bearing may be configured such that a plurality of grooves extending in the circumferential direction of the half bearing are located throughout the sliding surface excluding the recesses 71.

The invention claimed is:

1. A half bearing for constituting a sliding bearing for supporting a crankshaft of an internal combustion engine, the half bearing having a semi-cylindrical shape, and having an inner surface forming a sliding surface,
   wherein the sliding surface of the half bearing comprises a plurality of recesses, each recess having a smooth recess surface, the recess surface being recessed from the sliding surface toward an outer diameter side of the half bearing,
   wherein the recess surface forms a convex curve toward the outer diameter side of the half bearing in a cross-sectional view in any direction perpendicular to the sliding surface of the half bearing,
   wherein the recess surface comprises a plurality of circumferential grooves, the circumferential grooves being recessed from the recess surface toward the outer diameter side of the half bearing, and
   wherein the circumferential grooves extend along a circumferential direction of the half bearing so that smooth surfaces and the circumferential grooves are alternately arranged on the recess surface.

2. The half bearing according to claim 1, wherein the recesses have a depth of 2 to 50 μm.

3. The half bearing according to claim 1, wherein the circumferential grooves have a maximum depth of 0.2 to 3 μm.

4. The half bearing according to claim 1, wherein the circumferential grooves have a width of 5 to 50 μm.

5. The half bearing according to claim 1, wherein the circumferential grooves are arranged with a pitch of 5 to 100 μm.

6. The half bearing according to claim 1, wherein the recesses are uniformly located throughout the sliding surface of the half bearing.

7. The half bearing according to claim 1, wherein as the recess is located closer to a circumferential center of the half bearing, a depth of the recess is increased.

8. The half bearing according to claim 1, wherein as the recess is located closer to a circumferential center of the half bearing, an area of an opening of the recess is increased.

9. The half bearing according to claim 1, wherein the recesses have an opening of an elliptical shape, a major axis of the elliptical shape extending along the circumferential direction of the half bearing.

10. A sliding bearing for supporting a crankshaft of an internal combustion engine, comprising the half bearing according to claim 1, the sliding bearing having a cylindrical shape.

11. The sliding bearing according to claim 10, wherein the sliding bearing comprises a combination of a pair of the half bearings.

* * * * *